Figure 1:
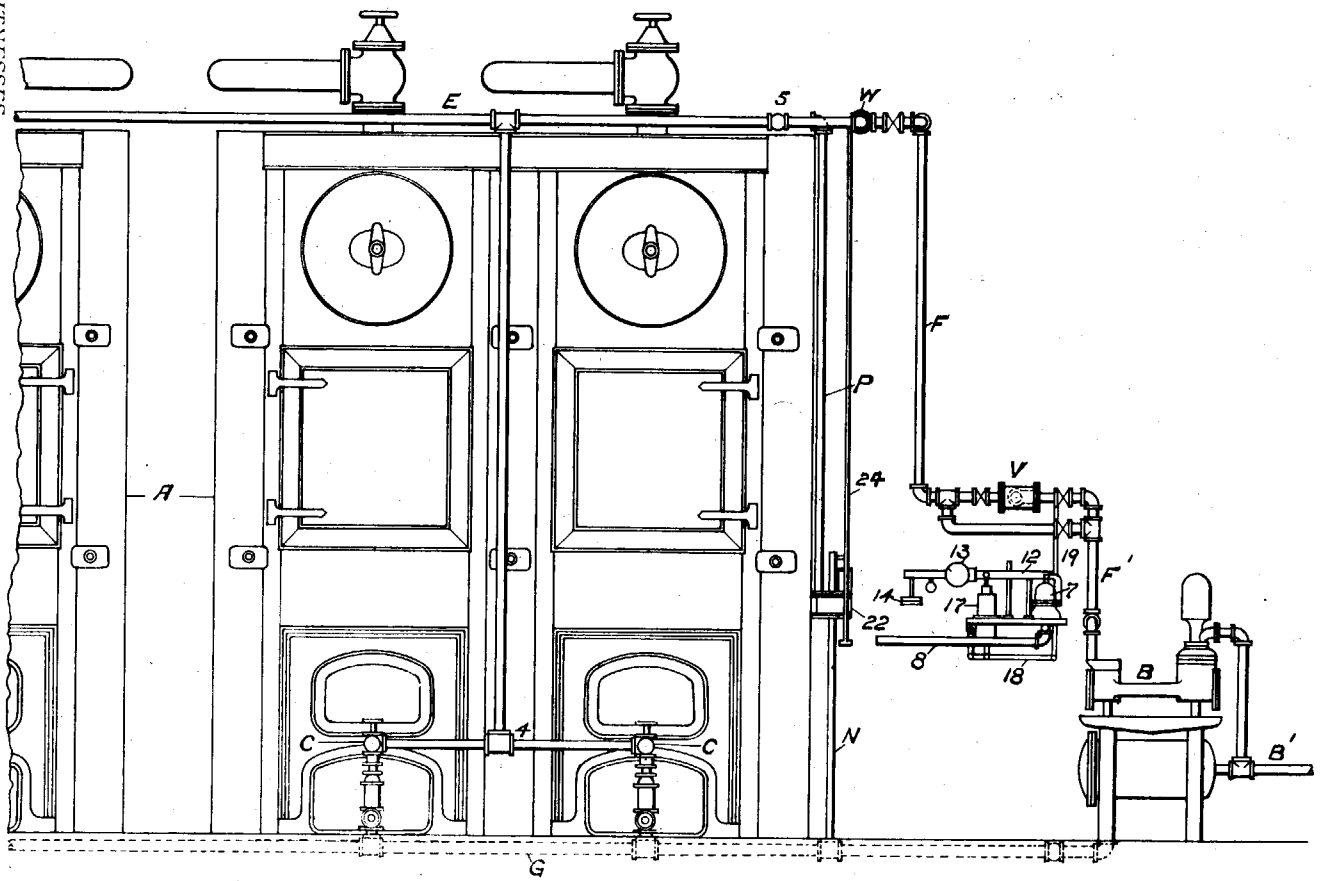

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911.

13,337.

6 SHEETS—SHEET 1.

WITNESSES:

H. C. Fiedler

Nellie B. Keating

INVENTORS,

J. R. Atchison

C. R. Weymouth

BY

F. M. Wright,

ATTORNEY.

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911.

13,337.

6 SHEETS—SHEET 2

WITNESSES:

F. C. Gardner

Nellie B. Keating

INVENTORS,

J. R. Atchison

C. R. Weymouth

BY

Fm. Wright,

ATTORNEY.

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911.

13,337.

6 SHEETS—SHEET 3.

WITNESSES:

F. C. Fredues

Nellie B. Keating

INVENTORS.

J. R. Atchison

C. R. Weymouth

BY

Fm. Wright,

ATTORNEY.

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911.

13,337.

6 SHEETS—SHEET 4.

WITNESSES:

H. C. Hiedum

Nellie B Keating

INVENTORS,

J. R. Atchison

C. R. Weymouth

BY

Fm. Wright,

ATTORNEY.

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911. 13,337.

6 SHEETS—SHEET 5.

WITNESSES:

F. C. Fliedner

Nellie B. Keating

INVENTORS,

J. R. Atchison

C. R. Weymouth

BY

F. M. Wright,

ATTORNEY.

J. R. ATCHISON & C. R. WEYMOUTH.

SYSTEM OF REGULATION FOR OIL BURNING PLANTS.

APPLICATION FILED OCT. 19, 1908.

Reissued Dec. 12, 1911.

13,337.

6 SHEETS—SHEET 6.

WITNESSES:

H. C. Heidner

Nellie B. Keating

INVENTORS,

J. R. Atchison

C. R. Weymouth

BY

F. M. Wright,

ATTORNEY.

UNITED STATES PATENT OFFICE.

JAMES R. ATCHISON, OF SAN FRANCISCO, AND CLARENCE R. WEYMOUTH, OF BERKELEY, CALIFORNIA, ASSIGNORS TO CHAS. C. MOORE & CO., ENGINEERS, INC., A CORPORATION OF CALIFORNIA.

SYSTEM OF REGULATION FOR OIL-BURNING PLANTS.

13,337. Specification of Reissued Letters Patent. Reissued Dec. 12, 1911.

Original No. 886,466, dated May 5, 1908, Serial No. 285,504. Application for reissue filed October 19, 1908. Serial No. 458,572.

*To all whom it may concern:*

Be it known that we, JAMES R. ATCHISON and CLARENCE R. WEYMOUTH, citizens of the United States, residing, respectively, at San Francisco, in the county of San Francisco, and at Berkeley, in the county of Alameda, State of California, have invented certain new and useful Improvements in Systems of Regulation for Oil-Burning Plants, of which the following is a specification.

Our invention relates to a novel automatic system of regulation for oil burning plants, and particularly to a method or process for such regulation. Illustrative apparatus of a practical character, adapted to carry out the said method or process is shown in the accompanying drawings, and is herein described in order that the nature of the process shall be thoroughly understood. Such apparatus contains many novel features in design and construction, which will be made the subject of separate applications.

The essential idea or principle of our invention consists in utilizing the variation of oil pressure in a main connecting with all burners so as to automatically regulate the supply of steam to the burners, steam being there employed for atomizing the oil. That is to say the variation in oil pressure, according to the demand for steam, is utilized to control the steam pressure in a steam main connecting with all the oil burners. Further the variations in pressure in the common oil main are employed to regulate the amount of opening in a damper, so as to give a greater or less supply of air for combustion. The variation in the pressure in the oil main is caused by the operation of an automatic pump governor by which the supply of steam to the oil supply pumps is regulated, the object being to maintain a uniform boiler pressure.

We are not aware that it has even been proposed to take advantage of the necessary variations in oil pressure for controlling the supply of steam for atomizing purposes, or for damper regulation.

Figure 2:
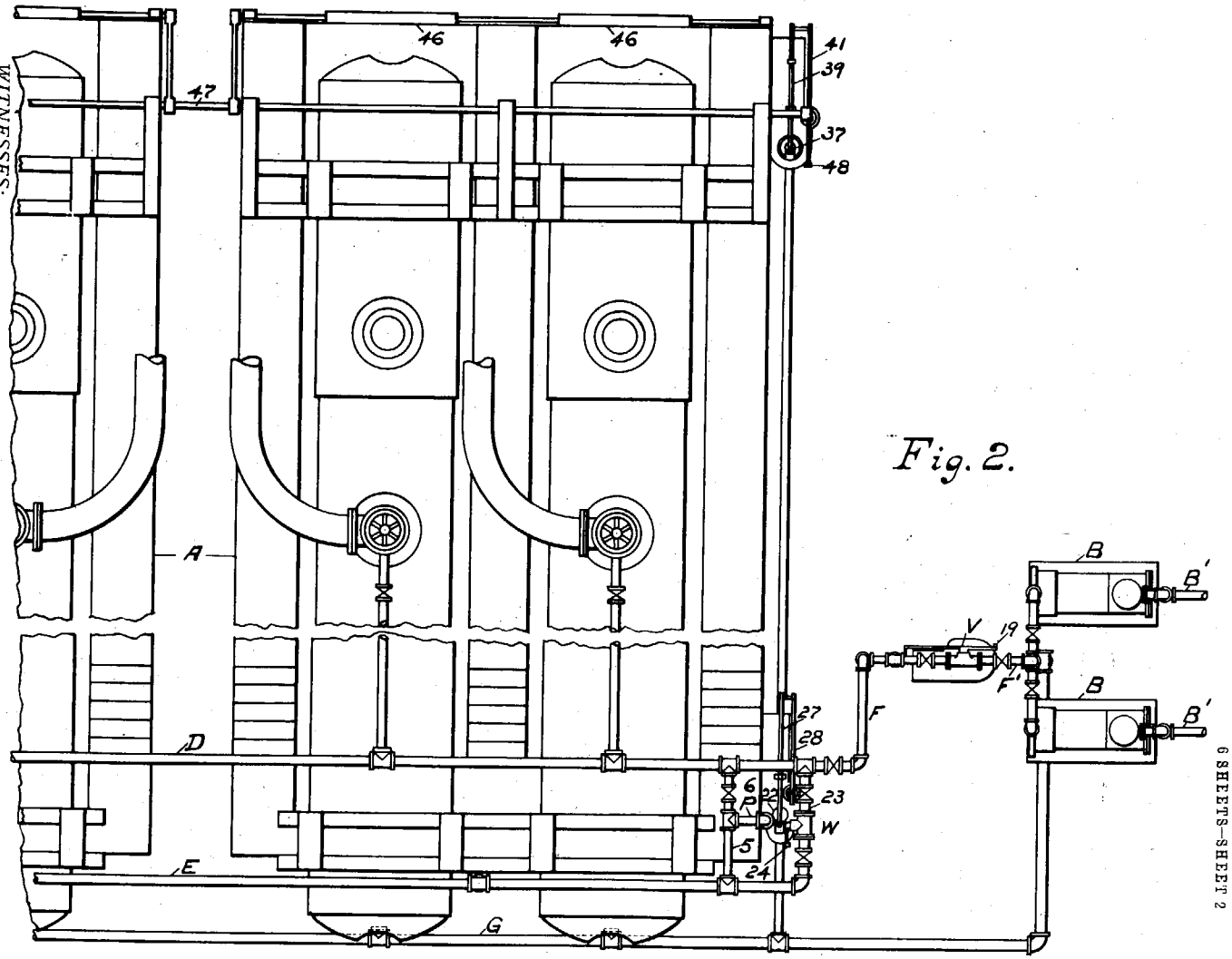
Figure 3:
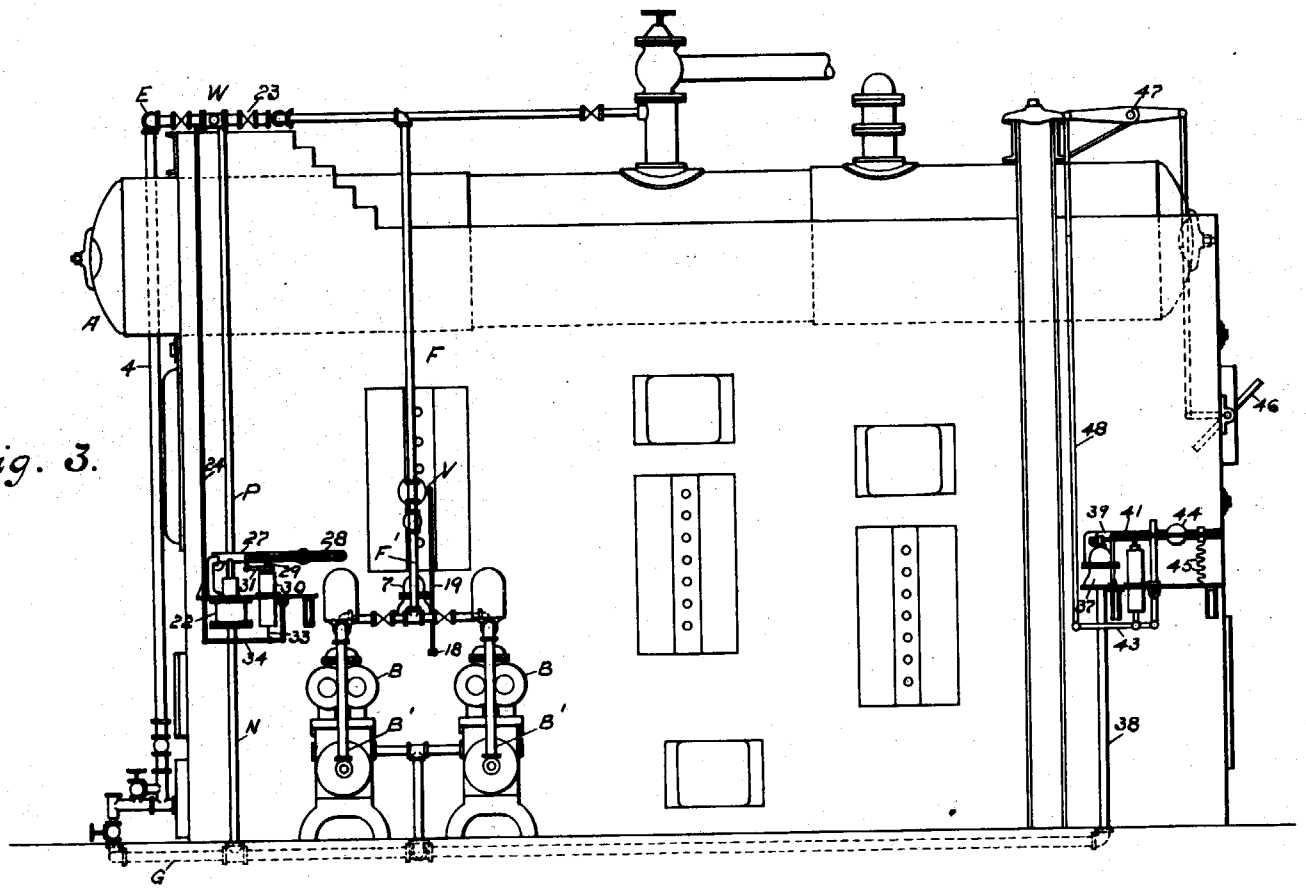
Figure 4:
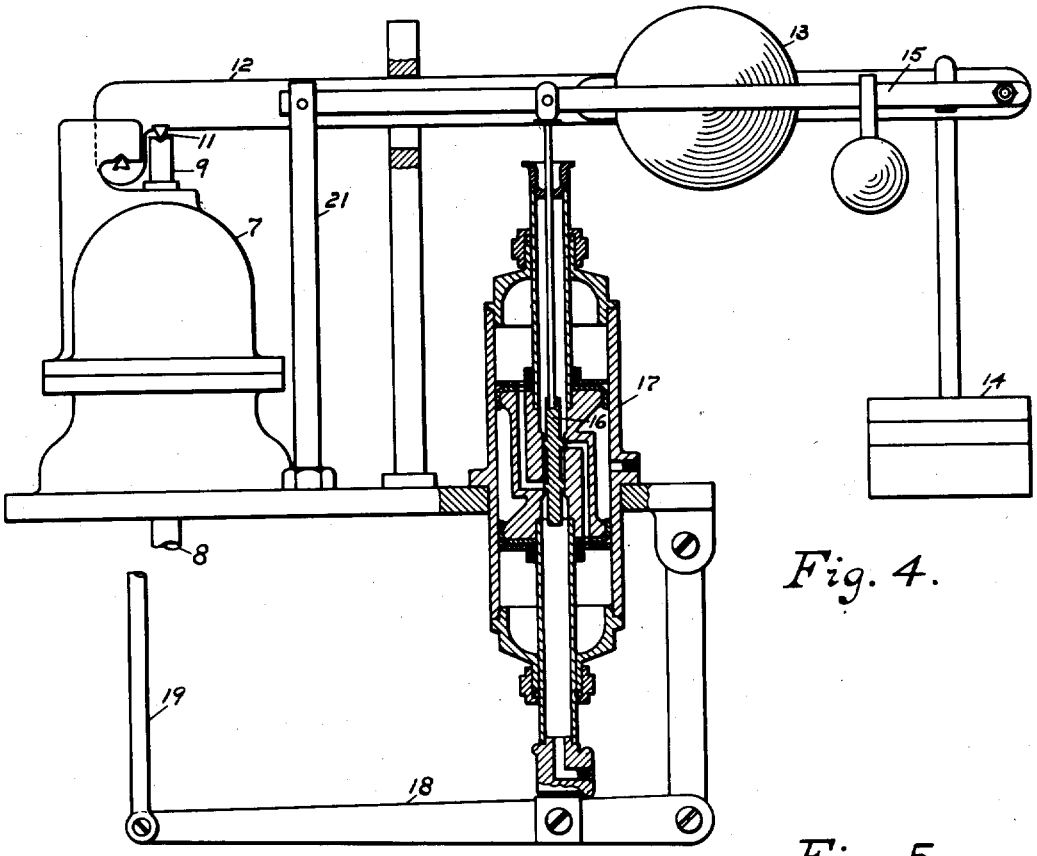
Figure 5:
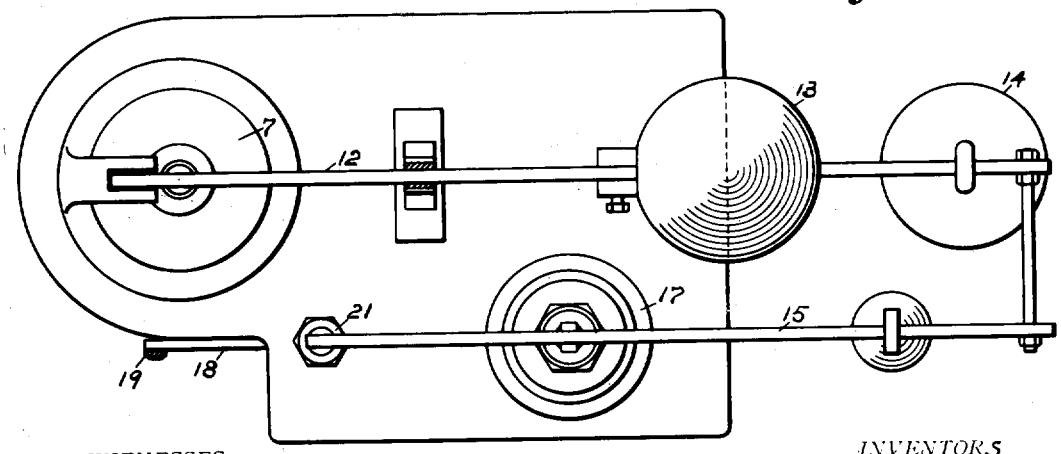
Figure 6:
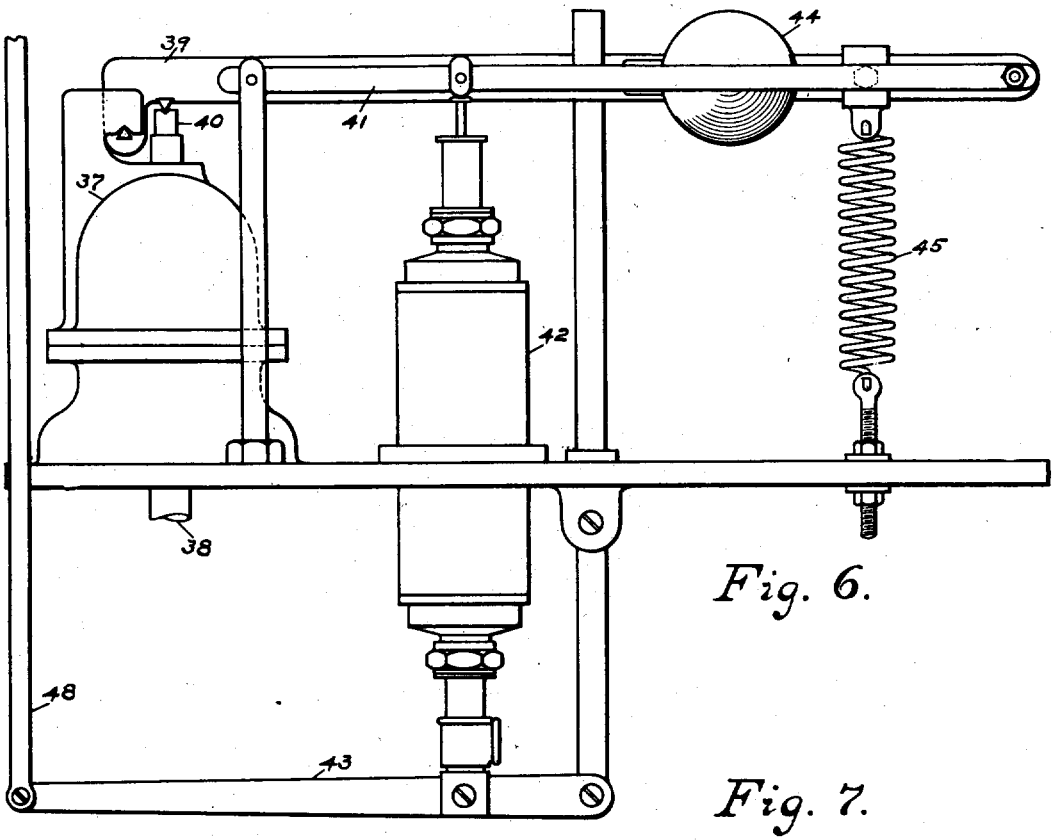
Figure 7:
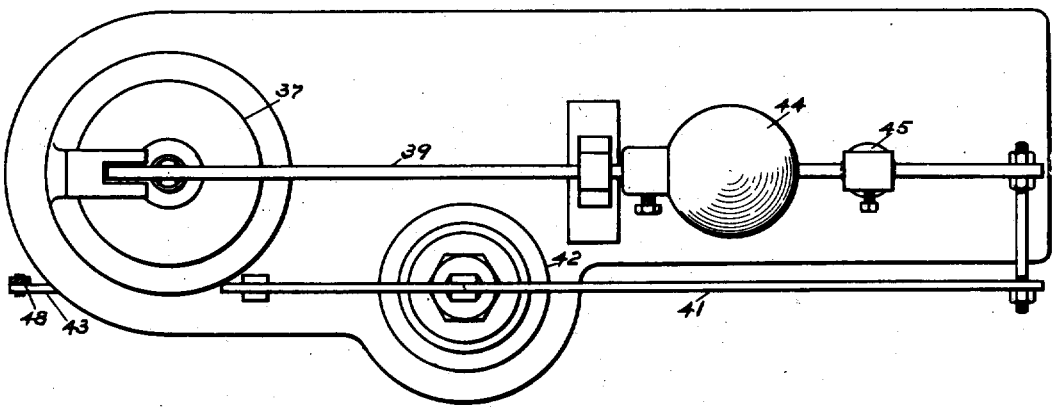
Figure 8:
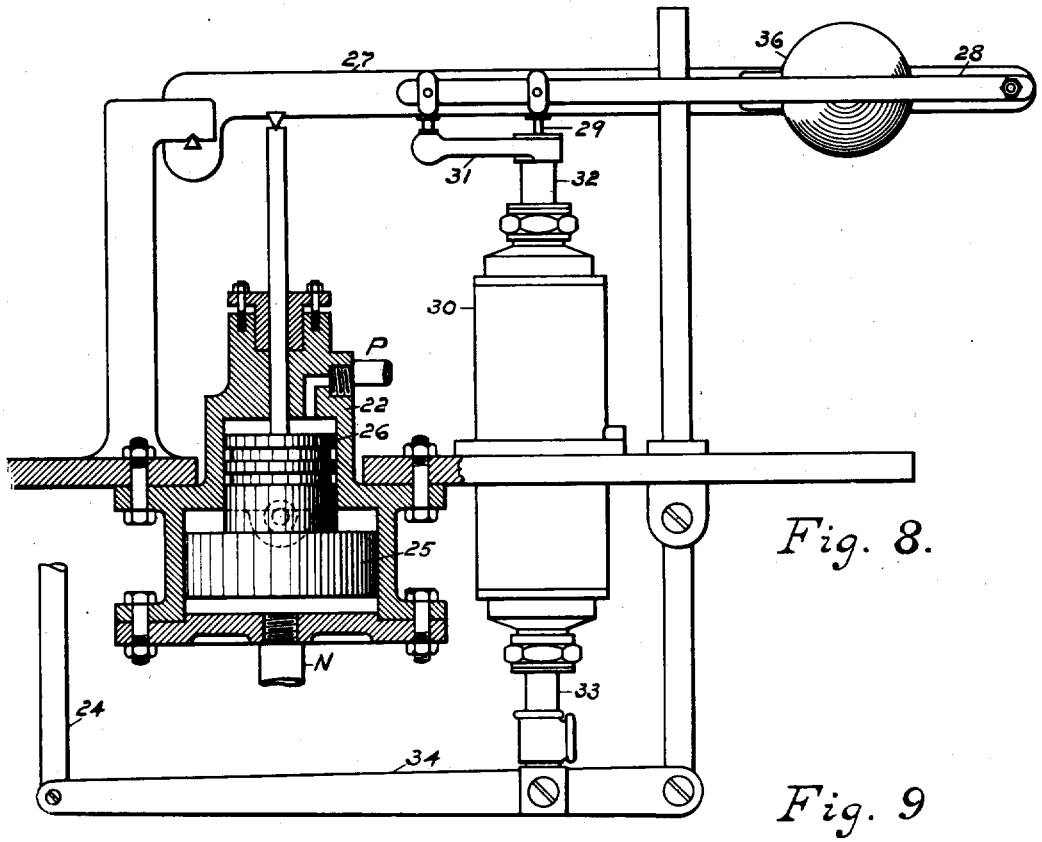
Figure 9:
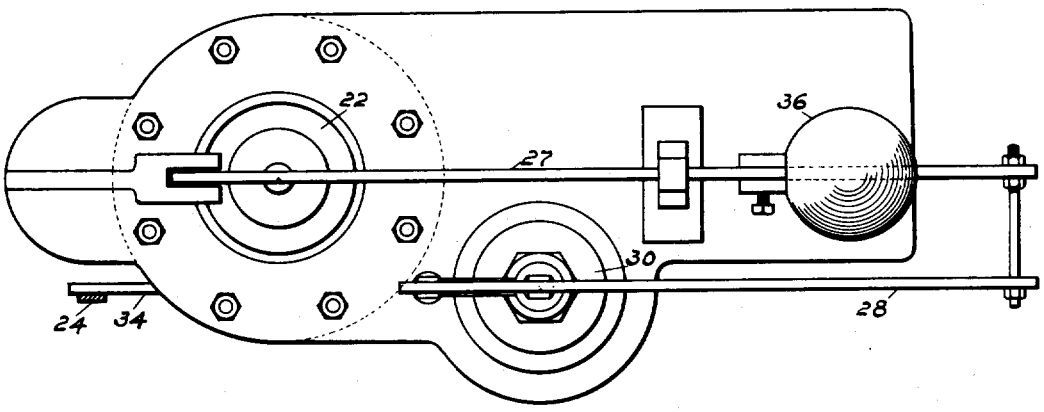

The principles of our system as applied to a steam boiler plant burning oil fuel which is atomized by steam is susceptible of other applications without material change, and we mention some of these in order that the range and scope of the invention may be thoroughly understood. For example in boiler plants using air as the atomizing agent, the variations in oil pressure can be used for air pressure regulation in substantially the same manner as for steam pressure regulation as we describe it. Again in such plants as forging furnaces, ore roasting furnaces, reverberatory furnaces employing fuel oil and atomizing by steam or air, the variations in oil pressure can be used to control automatically the supply of steam or of air for atomizing, or for controlling a damper opening or for both. Such modifications in apparatus as will be required under these conditions will be apparent to those skilled in the art after an understanding of the process as applied to steam boiler plants as hereinafter described and as shown in the accompanying drawings in which:

Figure 1 is a front elevation of a battery of steam boilers in connection with an installation of apparatus for carrying out our process; Fig. 2 is a top plan of the same; Fig. 3 is an end elevation of the same; Fig. 4 is an elevation partly in section of the oil pump governor; Fig. 5 is a top plan of the same; Fig. 6 is an elevation of the damper regulator; Fig. 7 is a plan view of the same; Fig. 8 is a sectional elevation of the steam pressure governor; Fig. 9 is a plan view of the same.

In Figs. 1, 2 and 3 a plant employing our system is shown with its parts in assembly and connection.

The steam boilers A, are supplied with oil burners C of any approved type and construction. Oil fuel is furnished to these burners through the oil main G which is common to all of them and delivers the oil to them through branch pipes as shown. Steam for atomizing purposes is applied to all the burners through pipes 4 from the steam main E. We have not considered it necessary to show in detail the construction of the oil burners or the arrangements for atomizing as they are well known, form no part of our invention, and may be of any desired construction. The pressure of steam in the main E is controlled and regulated by variations in the oil pressure as will be hereinafter described. It is connected directly to the auxiliary main D containing steam at full boiler pressure, by the branch 5 having the by-pass, valve 6, which pipe however is not intended to be used excepting in case the automatic regulator should fail to act or be out of order, when steam for the burners could be taken directly through the valve.

The oil pressure pumps B B can be of any desired construction and receive oil from a source of supply through pipes B′, B′, and steam from the boiler through the steam pipe F′ the pipe F having a suitable rotary valve V for governing the supply of the pipe F and the pipe F′ leading to the pumps. This valve is automatically regulated by the oil pumps governor shown in Figs. 4 and 5. This governor comprises a chamber 7 having a flexible diaphragm (not shown but in common use) which receives steam at boiler pressure on its under side through a pipe 8 communicating with any point where it is desired to control the pressure, as for instance the main steam header or the auxiliary steam main D. The diaphragm carries on its upper side a pin 9, which extends above the chamber and bears upon the point 11 of the weighted lever 12. The force exerted by steam pressure against the diaphragm is opposed by the weights 13, 14 which are adjusted to the desired initial or normal balance. When the steam pressure increases the lever 12 is lifted and also the auxiliary lever 15 which has a connecting rod to the piston 16 of the water cylinder 17, and is pivoted in the fulcrum 21. The piston is thus raised and, by its connection through the lever 18 and rod 19 communicates motion to the main steam valve V so as to decrease the steam supply to the pumps. A diminution of boiler pressure will cause the valve to be moved in the opposite direction and will thereby increase the steam supply to the pumps.

The pumps supply oil to the oil main G under varying pressures according to the demand for steam and we now explain how these varying pressures alone regulate the supply of steam for atomizing purposes. The steam pressure regulator is illustrated in Figs. 8 and 9 and a general view of its connections in Fig. 3. Its purpose is to cause the variation in oil pressure to control a valve in a pipe connecting the steam main D containing steam at boiler pressure, with the steam main E which directly supplies the burners, and in which the steam pressure is variable. This pipe is shown at 23 and is provided with any form of rotary valve W operated by a rod 24 whose connection to the valve is best shown in Figs. 2 and 3. Referring first to Figs. 8 and 9, the steam regulator comprises a casing or cylinder 22, or more properly two cylinders containing a two part piston which may or may not be integral. The lower end of the piston forms an oil piston 25 which is subjected to the varying oil pressure in the oil main through the branch pipe N and the upper end forms a steam piston 26 subjected to the varying pressure in the atomizing main E through the pipe P. The areas of the two ends or pistons may be varied relatively to each other in order to secure the proper ratio to be maintained between the oil pressure and the pressure of the atomizing agent to secure the best results under the varying oil pressures that must obtain, and especially with wide ranges of loads or demands upon steam. By changing the areas of these pistons as by making the oil piston of greater, the same or less area than the steam piston to suit the different conditions under which they are required to be operated and by combining or using them with a constant but adjustable weight upon the lever the pistons can be made to produce any desired method of governing the supply of steam and oil to the burners. The space between the inner end of the larger piston as the oil piston, and the end of the cylinder is preferably provided with a drip pipe as shown in dotted lines at 22′ to prevent the accumulation of moisture due to leakage which might interfere with the full and free movement of the piston.

A weighted lever 27 rests upon the stem of the piston and has its free end connected with the free end of a lever 28. The other end of the lever 28 is connected with the valve stem 29 of a piston in the water cylinder 30 similar to the construction shown in Fig. 4, but the lever is shown as being pivotally supported by a movable fulcrum as an arm 31 on the upper end of the piston rod 32 which renders it less sensitive than a fixed fulcrum, although it could be fixed if desired. The rod 33 forming the lower end of the piston is connected with a lever 34 which in turn is connected with valve W through the rod 24 whereby the movement of the oil and steam piston will control the passage of steam through the valve W.

In operation the weight 36 on the lever 27 is adjusted to hold the oil and steam pressures in equilibrium at any desired point. In case the load should be increased and a greater demand made for steam there would immediately be an increase in the oil pressure which would cause an upward movement of the piston and of the levers 27 and 28 and also of the lever 34 and rod 24 which would increase the opening in the rotative valve W and thereby admit more steam through the pipe P to the piston 26 until the pressure would be equalized and equilibrium restored. At the same time that the steam pressure is increased upon the piston it would be correspondingly increased at the burners and the equilibrium of the piston would hold the pressure at that point or degree so long as there was a demand for such a quantity of oil at the burners. A decrease in the oil pressure will cause an opposite movement of the regulator.

As above described it is evident that the amount of oil necessary for the combustion to keep the desired steam pressure will be controlled automatically and that the amount of atomizing agent whether of steam or of air will be also automatically controlled to correspond with the amount of oil. But it is desirable for the highest economy that the amount of air to support the combustion be also regulated. This can be done by means of dampers located at any desired point, as in the smoke stack, at the rear of the boilers or at the ash pit, depending on the type of boiler and other controlling conditions. In the construction shown in the drawings the air supply will be controlled entirely by the dampers at the rear of the boilers, the ash pit doors being opened to admit air freely. This regulator may or may not control the air supply exactly to give an amount of air proportional to the fuel being consumed that being determined by gas analysis only, and not by observation. In setting the dampers the draft from the stack, capacity of plant, etc., must be taken into consideration and a sufficient amount of air must be provided for the maximum overload as well as the fractional load. An arrangement of toggles such as to increase or decrease the relative motion of the damper regulator at each point will be determined by trial in each case so as to give as near as possible the proper air supply for all loads.

In Fig. 3 the regulator is shown in position relatively to the boilers and in Figs. 6 and 7 it is shown in detail. A chamber 37 is connected with the oil pressure main G by pipe 38 and provided with the usual diaphragm or piston the same as the oil pump governor. A lever 39 is actuated by this diaphragm through the stem 40 which actuates the auxiliary lever 41 and the lever 41 controls the piston in the water chamber 42 and thereby the lever 43. In addition to the weight 44 on the lever 39 a spring 45 is also preferably utilized for securing the desired pressure or tension upon the diaphragm to oppose the steam pressure. The dampers 46 at the rear of the boilers are connected with a rock shaft 47 and the shaft is connected with the lever 43 by a rod 48. Or the water chamber may be omitted where it is not desired to have the governor so sensitive and the rod 48 can be connected direct with the lever 39. The governor will be so arranged that the dampers will be opened to cause a greater supply of air when the oil supply is increased and closed with the decrease of oil.

While it does not make any difference whether the steam pipe 8 is connected directly with the boilers or the main steam headers connecting with the engines or the auxiliary headers, in a large plant it may be necessary to make the auxiliary steam main and the oil main leading to the burners of such size that there will not be serious drop of pressure between the point at which the governing is done and the extreme portion of the system; or a loop system can be provided to overcome the difficulty.

In a plant having a widely varying load a portion of the boilers can be cut in or out as the load varies by closing or opening the branch steam and oil connections to the individual burners, or the same total of boilers can be used and the load upon all of them can be increased or decreased equally. Where the boilers are cut in or out the dampers of the idle or cut out boilers can be fastened in a closed position if desired.

While we have herein illustrated and described means for varying the pressure of the steam and the pressure of the oil at the respective burners automatically, yet very advantageous results may also be obtained by so regulating said pressures by hand. These advantages are great economy in labor, in the supply of steam to burners, and in the proper and speedy proportioning of the fuel supply to all of the burners as required, and, as a result of this condition, an increased efficiency of combustion. In addition, when two or more furnaces are simultaneously operated on the same variable load, the simultaneous regulation of the firing in all furnaces at one time results in a still further furnace efficiency.

We claim:—

1. In a system of regulation for liquid fuel burning plants, a liquid fuel burner adapted to receive a continuous flow of liquid fuel and a continuous flow of an atomizing agent, means for varying the supply pressure of said liquid fuel and thus the rate of flow of said fuel through the burner, and means controlled by the variation of said liquid fuel pressure for automatically governing the supply pressure of said atomizing agent and thus the rate of flow of said atomizing agent through the burner and producing a continuous flow of said atomizing agent, the said governing being independent of a commingling action of said fuel and said atomizing agent, substantially as described.

2. In a system of regulation for liquid-fuel burning plants, steam-controlled means for feeding fuel thereto under a variable pressure, a damper, a rod for operating the same, and means controlled by the fuel pressure for varying the amount of opening of the damper and including a spring opposing the fuel pressure; said spring limiting the movement of the damper-rod so that such movement shall be proportional to said fuel pressure and to the deflection of said spring, substantially as described.

3. In a system of regulation for liquid fuel burning plants, means for feeding fuel thereto under a variable pressure, means for supplying an atomizing agent, under variable pressure, and means controlled by the fuel pressure for automatically varying the pressure of the atomizing agent and the quantity of air for combustion to correspond with the amount of fuel being consumed, substantially as described.

4. In a system of regulation for oil-burning plants, means for feeding oil thereto under variable pressure, means for supplying an atomizing agent to the burner under variable pressure, and external means controlled by the oil pressure for holding the pressures of the atomizing agent and of the oil in equilibrium at a certain relation, substantially as described.

5. In a system of regulation for oil burning plants, means for feeding oil thereto under a variable pressure, means for supplying an atomizing agent to the burner under a variable pressure, and means for establishing an equilibrium at a certain ratio between the pressure of the oil and that of the atomizing agent, whereby when said equilibrium is affected by variation in the oil pressure it is restored by automatic variation in the pressure of the atomizing agent, substantially as described.

6. In a system of regulation for oil burning plants, means for feeding oil thereto under variable pressure, means for supplying an atomizing agent to the burner under variable pressure, and means, including a member exerting a constant but adjustable pressure, for establishing an equilibrium at a certain ratio between the pressure of the oil and that of the atomizing agent, whereby when said equilibrium is affected it is restored by automatic variation in the pressure of the atomizing agent, substantially as described.

7. In a system of regulation for oil burning plants, means for feeding oil thereto under a variable pressure, means for supplying an atomizing agent to the burner under a variable pressure, a movable member subjected to such pressures in opposite directions, and a member for applying a constant but adjustable pressure to said movable member for establishing an equilibrium at a certain ratio between the pressure of the oil and that of the atomizing agent, whereby when said equilibrium is affected it is restored by automatic variation in the pressure of the atomizing agent, substantially as described.

8. In a system of regulation for oil burning plants, means for feeding oil thereto under a variable pressure, means for supplying an atomizing agent to the burner under a variable pressure, a reciprocatory member having surfaces of different areas subjected to said pressures in opposite directions, and a member for applying a constant but adjustable pressure to said reciprocatory member for establishing an equilibrium at a certain ratio between the pressure of the oil and that of the atomizing agent, whereby when the said equilibrium is affected it is restored by automatic variation in the pressure of the atomizing agent, substantially as described.

9. In a system of regulation for oil burning plants, means for feeding oil thereto under variable pressure, means for supplying an atomizing agent to the burner under variable pressure, a reciprocatory piston having its ends of different areas and subjected to said pressures in opposite directions for establishing an equilibrium at a certain ratio between the pressure of the oil and that of the atomizing agent, the pressure of the oil being exerted upon the larger area and that of the atomizing agent upon the smaller area, an adjustable weight, and means for applying the pressure of said weight to the smaller area in addition to the pressure of the atomizing agent, whereby when said equilibrium is affected it is restored by automatic variation in the pressure of the atomizing agent, substantially as described.

10. In a system of regulation for oil burning steam generating plants, means for feeding oil thereto under a variable pressure, a conduit leading to the burner for supplying steam in a certain ratio to the oil for atomizing purposes, a throttle in the conduit for varying the steam pressure to the burner, means connected with the throttle and controlled by the oil and steam pressures for varying the steam pressure to maintain the proper ratio at different oil pressures, substantially as described.

11. In a system of regulation for oil burning steam generating plants, means for feeding oil thereto under a variable pressure, a steam pipe for supplying steam to the burner in a certain ratio to the oil for atomizing purposes, a throttle in the pipe for varying the steam pressure therein to the burner, a movable member adapted to be controlled by the oil and steam pressures, and a system of levers controlled by said member and connected with said throttle for maintaining the proper ratio between the steam and oil at different oil pressures, substantially as described.

12. In a system of regulation for oil burning steam generating plants, means controlled by the steam pressure for varying the oil pressure, means for supplying steam to the burner under a variable pressure for atomizing purposes, means for controlling the admission of air for combustion, said last two mentioned means being automatically and synchronously operated by the oil pressure, substantially as described.

13. In a system of regulation for oil burning steam generating plants provided with a plurality of burners, an oil main common to all of the burners, an oil pump connected with the main, means for operating the pump directly with the generated steam, means controlled by the steam pressure from the plant for automatically varying the admission of steam to the pump whereby the pressure in the oil main is varied, means for supplying steam to the burners under a variable pressure for atomizing purposes, means for controlling the admission of air for combustion, said last two means being connected with the oil main and adapted to be automatically and synchronously controlled by the oil pressure, substantially as described.

14. In a system of regulation for oil burning steam generating plants having a plurality of burners, an oil main common to all of the burners, an oil pump connected to the oil main, an auxiliary steam pipe connected with the pump, a main steam pipe common to all the burners and receiving its supply from said auxiliary steam pipe, means controlled by the steam pressure in the auxiliary steam pipe for automatically varying the admission of steam to the pump inversely as the steam pressure, and means for controlling the admission of steam to the main steam pipe whereby the steam pressure to the burners may be varied to correspond with the oil pressure, the means for controlling the admission of steam to the main steam pipe being connected with the oil main and adapted to be automatically and synchronously controlled by the oil pressure, substantially as described.

15. In a system of regulation for fluid fuel burning plants, a fluid fuel burner, means for feeding fluid fuel thereto under a variable pressure, means actuated independently of the fuel feed for supplying air for combustion, and means controlled by said variable fuel pressure for varying the rate of said supply of air, substantially as described.

16. In a system of regulation for fluid fuel burning plants, a fluid fuel burner, means for feeding fluid fuel thereto under a variable pressure, means controlled by the steam pressure for varying the pressure of the fuel so fed, means actuated independently of the fuel feed for supplying air for combustion, and means controlled by said variable fuel pressure for varying the rate of said supply of air, substantially as described.

17. In a system of regulation for liquid fuel burning plants, means for feeding liquid fuel thereto, means for varying the pressure of the fuel so fed, means for varying the supply of atomizing agent, means for supplying air for combustion, and means controlled by the pressure of the fuel for varying the rate of air supply, substantially as described.

18. In a system of regulation for liquid fuel burning plants, means for feeding liquid fuel thereto, means controlled by the steam pressure for varying the pressure of the fuel so fed, means for varying the supply of atomizing agent, means for supplying air for combustion, and means controlled by the pressure of the fuel for varying the rate of air supply, substantially as described.

19. In a system of regulation for liquid fuel burning plants, means for feeding liquid fuel thereto under variable pressure, means for applying an atomizing agent under variable pressure, means controlled by the liquid fuel pressure for automatically varying the atomizing pressure, and means controlled by the steam pressure for automatically varying the liquid fuel pressure, substantially as described.

20. In a system of regulation for liquid fuel burning plants, means for feeding liquid fuel to a plurality of burners, means for simultaneously varying the liquid fuel pressure at all of said burners, individual pipes for supplying an atomizing agent to said burners, and means independent of the aforesaid varying means for simultaneously varying the pressure of said agent in all of said pipes, substantially as described.

21. In a system of regulation for liquid fuel burning plants, means for feeding liquid fuel to a plurality of burners, means controlled by the steam pressure for varying the liquid fuel pressure at each of said burners, individual pipes for supplying an atomizing agent to said burners, and means independent of the aforesaid varying means for simultaneously varying the pressure of said agent in all of said pipes, substantially as described.

JAMES R. ATCHISON.
CLARENCE R. WEYMOUTH.

Witnesses:
F. M. WRIGHT,
NELLIE B. KEATING.

Copies of this patent may be obtained for five cents each, by addressing the "Commissioner of Patents, Washington, D. C."